(12) United States Patent
Coulmeau et al.

(10) Patent No.: US 9,176,499 B2
(45) Date of Patent: Nov. 3, 2015

(54) FLIGHT MANAGEMENT METHOD AND SYSTEM

(71) Applicant: THALES, Neuilly-sur-Seine (FR)

(72) Inventors: Francois Coulmeau, Seilh (FR); Jerome Sacle, Tournefeuille (FR); Johan Boyer, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/521,239

(22) Filed: Oct. 22, 2014

(65) Prior Publication Data

US 2015/0120095 A1    Apr. 30, 2015

(30) Foreign Application Priority Data

Oct. 25, 2013    (FR) .................................... 13 02469

(51) Int. Cl.
| | |
|---|---|
| *G05D 1/00* | (2006.01) |
| *G08G 5/00* | (2006.01) |
| *G01C 23/00* | (2006.01) |
| *G05D 1/04* | (2006.01) |
| *G05D 1/06* | (2006.01) |
| *G08G 5/02* | (2006.01) |

(52) U.S. Cl.
CPC ........ *G05D 1/00* (2013.01); *G01C 23/00* (2013.01); *G05D 1/042* (2013.01); *G05D 1/0676* (2013.01); *G08G 5/003* (2013.01); *G08G 5/0021* (2013.01); *G08G 5/025* (2013.01)

(58) Field of Classification Search
USPC ............................................................. 701/3
See application file for complete search history.

(56) References Cited

U.S. PATENT DOCUMENTS

| | | | | |
|---|---|---|---|---|
| 5,115,996 | A | * | 5/1992 | Moller ........................ 244/12.5 |
| 7,159,817 | B2 | * | 1/2007 | VanderMey et al. ......... 244/12.1 |
| 7,611,098 | B2 | | 11/2009 | Van Boven |
| 8,027,758 | B2 | | 9/2011 | Ferro et al. |
| 8,170,727 | B2 | * | 5/2012 | Deker ............................. 701/3 |
| 8,271,152 | B2 | * | 9/2012 | Singer et al. ..................... 701/4 |
| 8,356,776 | B2 | * | 1/2013 | Berens et al. ................. 244/183 |
| 8,386,100 | B1 | * | 2/2013 | Lie ................................. 701/14 |
| 8,554,394 | B2 | * | 10/2013 | Shamasundar ................. 701/14 |
| 8,655,506 | B2 | * | 2/2014 | Gomez et al. .................... 701/3 |
| 8,676,403 | B2 | * | 3/2014 | Garrido-Lopez et al. ........ 701/3 |

(Continued)

FOREIGN PATENT DOCUMENTS

| | | |
|---|---|---|
| EP | 2551836 A1 | 1/2013 |
| FR | 2881234 A1 | 7/2006 |

*Primary Examiner* — Thomas Tarcza
*Assistant Examiner* — Alex C Dunn
(74) *Attorney, Agent, or Firm* — Baker & Hostetler LLP (57) ABSTRACT

A method is provided for managing the flight of an aircraft flying a trajectory calculated by a flight management system. The trajectory necessitates at least one transition between two different aerodynamic configurations of the aircraft. The method comprises: extraction of performance data of the aircraft from a database, at least one item of performance data being a function of an aerodynamic configuration, selection between a first determination step and a second determination step, a step of determination of a start point and of an end point of the transition between two aerodynamic configurations and engine speeds of an aircraft during a flight, the determination step being implemented by the flight management system and chosen from among the first and second determination steps, the determination step calculating the trajectory by numerical integration of the equations representative of the dynamics of the aircraft making use of the performance data of the aircraft.

11 Claims, 9 Drawing Sheets

(56) References Cited

U.S. PATENT DOCUMENTS

| | | | |
|---|---|---|---|
| 8,781,649 B2* | 7/2014 | Kar et al. | 701/3 |
| 8,880,247 B2* | 11/2014 | Luckner et al. | 701/18 |
| 8,914,233 B2* | 12/2014 | Tseng | 701/454 |
| 2006/0151666 A1* | 7/2006 | VanderMey et al. | 244/12.3 |
| 2006/0273928 A1* | 12/2006 | Van Boven | 340/945 |
| 2012/0158220 A1* | 6/2012 | Accardo et al. | 701/15 |
| 2013/0030611 A1 | 1/2013 | Constans et al. | |
| 2014/0032107 A1* | 1/2014 | Courteville et al. | 701/528 |

\* cited by examiner

FLIGHT MANAGEMENT METHOD AND SYSTEM

CROSS-REFERENCE TO RELATED APPLICATION

This application claims priority to foreign French patent application No. FR 1302469, filed on Oct. 25, 2013, the disclosure of which is incorporated by reference in its entirety.

FIELD OF THE INVENTION

The invention relates to the field of flight management, in particular the management of flight procedures. Among other things the invention makes it possible to determine and display the start and end of transitions between different aerodynamic configurations and engine speeds of an aircraft during a flight. The invention also makes it possible to determine and display the impact of the transitions on the end of flight time. The invention can for example be used in the context of approaches known by the English acronym CDA (Continuous Descent Approach).

BACKGROUND

A continuous descent approach is an approach that does not include level flight sections such as those present in conventional approaches. This approach in particular makes it possible to simplify the separation of different aircraft into different flows. This approach is made by making the aircraft comply with two constraints. The first constraint that the aircraft must comply with is the angle of the flight plane, also known by the English acronym FPA (Flight Path Angle). This angle is generally included between $-2°$ and $-3°$. The second constraint that the aircraft must comply with is the speed with respect to the ground. However, the aircraft cannot directly know its speed with respect to the ground. In fact the aircraft can only know its speed with respect to the surrounding mass of air (this speed is also known by the expression "indicated speed" or by the English acronym IAS (Indicated Air Speed)). Via equipments external to the aircraft, it can also know the speed of the surrounding mass or air, or wind speed. By using these two speeds, the systems of the aircraft can determine the speed of the aircraft with respect to the ground.

This approach is conventionally managed by the fight management system, also known by the English acronym FMS (Flight Management System). In order to control its trajectory, the flight management system acts on the position of the flaps, slats, airbrakes and undercarriages. Some of these items can assume several positions, which is the case for the flaps and the slats. The airbrakes can assume several discrete positions (generally "retracted", "deployed" and "50% deployed", but some aircraft can have intermediate settings like 25% and 75%). The undercarriages can only assume two positions, a retracted position and a deployed position. The expression aerodynamic configuration is used to denote a configuration of the positions of these various elements. The flight management system also acts on the speed of the different engines.

For some types of flight, like for example the CDA approaches, the start and end points of the transitions between the different configurations cannot be calculated in the same way as for a conventional descent. Similarly, the impact of the transitions on the end time of the flight cannot be calculated in the conventional way.

The U.S. Pat. No. 7,611,098 and U.S. Pat. No. 8,027,758 propose a method for calculating the end time of the CDA procedure by taking account of the different configurations of the aircraft during the descent. However, these two patents do not take account of the dynamics associated with these different transitions. Thus, in these patents, the flaps are considered as having a distinct and finite number of positions and the effect of the transition on the trajectory of the aircraft is not taken into account. Moreover, these patents do not present the determination of the start and end points of the different transitions between aerodynamic configurations nor the impact of these transitions on the end time of the flight.

The patent application EP 2551836 presents a method taking into account the dynamics of transition between the different aerodynamic configurations; however, this patent application presents this taking into account in order to optimize the management of the energy of the aircraft and not to determine the start and end points of the different transitions between the aerodynamic configurations or the impact of these transitions on the end time of the flight.

SUMMARY OF THE INVENTION

The purpose of the invention is to overcome the problems mentioned above by proposing a flight management method making it possible, among other things, to determine the start and end points of each of the transitions between two aerodynamic configurations.

According to a first aspect, the invention relates to a method for managing the flight of an aircraft flying a trajectory determined from a flight plan and calculated by a flight management system, the said trajectory necessitating at least one transition between two different aerodynamic configurations of the aircraft, the said method comprising:
  a step of extraction of performance data of the aircraft from a database, at least one item of performance data being a function of an aerodynamic configuration,
  a step of selection between a first determination step and a second determination step,
  a step of determination of a start point and of an end point of the said transition between two aerodynamic configurations and engine speeds of an aircraft during a flight, the said determination step being implemented by the flight management system and chosen from among the said first and second determination steps,
  the said determination step calculating the trajectory by numerical integration of the equations representative of the dynamics of the aircraft making use of the said performance data of the aircraft,
  the said first determination step taking account of a variation of the performance data during the said transition, and being selected when the said performance data make it possible to calculate the said variation,
  the said second determination step considering the said transition as immediate and being selected when the said performance data do not make it possible to calculate the said variation.

According to one embodiment, the method according to the invention is used during a continuous descent procedure.

According to one embodiment, the first determination step comprises:
  a step of calculating a variation of descent angle from a dynamic drag coefficient,
  a step of calculating a speed variation of the aircraft from the said dynamic drag coefficient,
  a step of calculating a variation of the trajectory of the aircraft followed by a calculation of the value of the said drag coefficient at a time t+dt, as an input value in the step of determining the variation of the descent angle of the aircraft.

According to one embodiment the second determination step comprises:
- a step of determining the transition start point by numerical integration of the equations representative of the dynamics of the aircraft using the said performance data, considering the said transition as immediate,
- a step of determination of the duration of the said transition,
- a step of determination of the distance traveled during the said transition from a speed of the aircraft and
- a step of determination of the end point of the said transition by adding the said distance traveled to the start point associated with the said transition.

According to another embodiment, the flight management method according to the invention comprises moreover a step of determination of a temporal impact of the transition on an end time of the flight from the duration of the transition.

According to one embodiment, the third determination step comprises:
- a step of determination of a first drag coefficient of the aircraft before the transition,
- a step of determination of a second drag coefficient of the aircraft after the transition,
- a step of determination of two speeds of the aircraft associated with the first and second drag coefficients respectively and
- a step of determination of the temporal impact from a difference between the said two speeds.

As a variant, the flight management method according to the invention comprises a step of displaying the impact.

Advantageously, the flight management method according to the invention comprises a step of displaying the transition start and end points for each transition.

According to one embodiment, the flight management method according to the invention comprises a step of selection (703) between the carrying out of step of display (702) of the impact or a step of display of the transition start and end points.

According to another aspect, the invention relates to a flight management system of an aircraft flying a trajectory determined from a flight plan, the said trajectory necessitating at least one transition between two different aerodynamic configurations of the aircraft, adapted for the use of the method according to the invention and comprising:
- a database comprising:
  - elements making it possible to calculate the trajectory of the aircraft taking account of a variation of the performance data during the transition, and/or
  - elements allowing an estimation of the duration of the transition.
- a processor configured or programmed to determine a start point and an end point of a transition between two aerodynamic configurations and engine speeds of an aircraft during a flight by calculation of the trajectory by numerical integration of the equations representative of the dynamics of the aircraft using the performance data of the aircraft,
- a graphical interface configured to display the said start points and end points of transitions.

According to one embodiment the processor is configured or programmed to determine an impact of the transition on an end time of the flight from a duration of the transition and wherein the graphical interface is configured to display the impact.

BRIEF DESCRIPTION OF THE DRAWINGS

The invention will be better understood and other advantages will become apparent on reading the detailed description given by way of non-limiting example and with reference to the figures among which:

FIGS. 8.a, 8.b, 8.c and 8.d show embodiments of the graphical interface.

DETAILED DESCRIPTION

Figure 1:
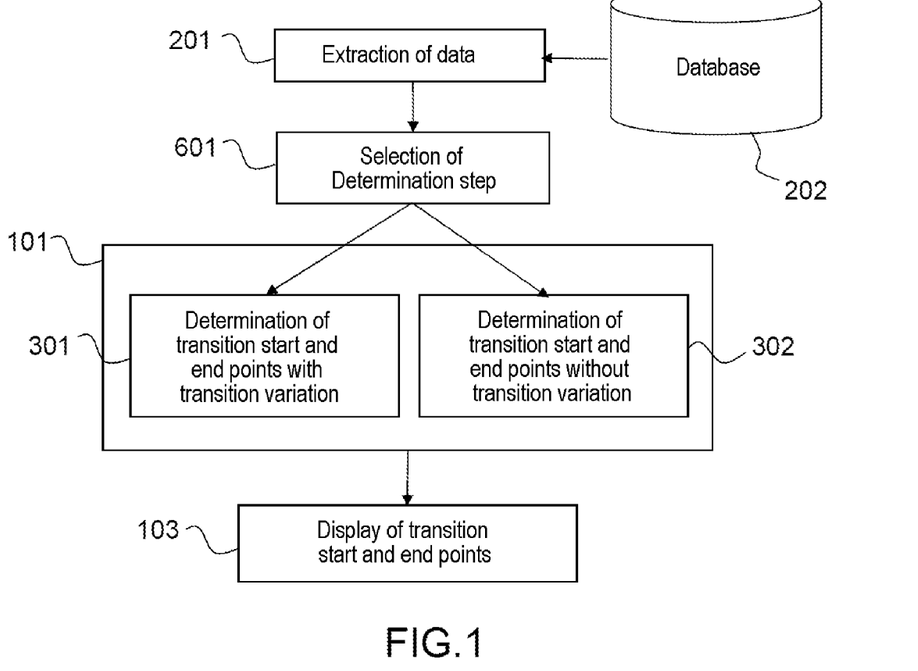
FIG. 1 shows the flight management method.

FIG. 1 therefore shows the flight management method according to the invention. The method is applied to an aircraft flying a trajectory determined from a flight plan and calculated by a flight management system or FMS. The trajectory for which the method is applied necessitates at least one transition between two different aerodynamic configurations of the aircraft.

If the trajectory necessitates several transitions, the method is applied in the same way for each transition.

The method comprises a step 201 of extraction of performance data of the aircraft from a database 202, at least one item of performance data being a function of the aerodynamic configuration of the aircraft. Examples of items of data performance are described below.

The method then comprises a step of selection 601 between a first determination step 301 and a second determination step 302 described below.

The method then comprises a step of determination 101 of a start point and an end point of each transition between two aerodynamic configurations and engine speeds of an aircraft during a flight.

A transition has a certain duration, during which the different systems acting on the aerodynamic configuration of the aircraft are put into motion between an initial position (initial aerodynamic configuration) and a final position (final aerodynamic configuration).

A transition start or end point is for example characterized by a value of the horizontal coordinate along the trajectory, a time or a distance with respect to the destination or with respect to the aircraft.

This determination step 101 is implemented by the flight management system and chooses between the first 301 and the second 302 determination step.

The determination step, for each transition, of the start point and of the end point of the transition is carried out by calculating the trajectory of the aircraft by numerical integration of the equations representative of the dynamics of the aircraft using the performance data of the aircraft, as described in detail below.

The first determination step 301 takes into account:
the variation of the performance data during the transition, that is to say the dynamics of the movement of the retraction or deployment systems of the different elements characterizing the aerodynamic configuration of the aircraft, namely the slats and the flaps, the air brakes and the undercarriage, and this throughout the duration of the transition, and the impact of the movement of these systems on the trajectory. These systems in fact have an impact on the ground speed or on the descent angle of the aircraft and therefore affect its trajectory.

This first step is selected when the performance data make it possible to calculate the variation, that is to say when the database comprises the elements necessary for taking into account the variation in the calculation of the trajectory.

The second determination step 302 considers the transition as being immediate and takes account solely of the duration of the transition in a simplified manner, which allows an approximate calculation of the transition start point not necessitating too long a calculation time.

This second step is selected when the performance data does not make it possible to calculate the variation, that is to say when the database does not comprise the elements necessary for taking account of the variation in the calculation of the trajectory.

In other words, the selection 601 makes it possible to check that the performance data make it possible to take account of the variation of the transition.

Then, if the data makes it possible, the determination step 301 then allows the calculation of the start point and the end point of the transition, by integrating the equations of the aircraft dynamics according to the conventional formulae. The start and end points for each of the transitions are available on output.

If the selection step 601 has shown that the performance data does not make it possible to take the variation of the transition into account, then the second determination step 302 allows the calculation of an estimation of the start point of the transition by considering the transition as being instantaneous. Then, on the basis of heuristics over the duration of each transition, it is possible to calculate the end point of these transitions.

The performance database comprises elements making it possible to calculate the trajectory of the aircraft taking into account the effect of the transitions and/or the elements allowing an estimation of the durations of the transitions.

The method has the advantage of integrating, when the data are available, the dynamics of the systems of the aircraft providing the management of its aerodynamic configuration. When the data are not available, the method carries out an estimation of the start point of the transition on the basis of heuristics over the duration of the transition in question.

This method can be used, for example, for determining the start and end points of transitions during a continuous descent procedure. The method also applies to any flight phase during which a change of configuration is necessary, for example when the aircraft must fly a part of its flight at reduced speed.

As a variant, the method comprises a step 103 of display of the transition start point and/or the transition end point for each transition.

This display has the advantage of giving the pilot reliable information on the opportune moment of the change of configuration, ensuring that the execution of the manoeuvre occurs at the same time as that which was calculated by the system in order to guarantee the time of arrival at the end of the procedure, for a landing for example.

It should be noted that, at present, the change of configuration is carried out manually by the pilot.

It can also be controlled automatically by the FMS system. In fact the method according to the invention makes it possible, if the system is coupled with aircraft automatisms managing the putting into configuration (change from one configuration to another), to automate this putting into configuration at the opportune moment.

Preferably, the determination step 101 is implemented by standard equipments of a flight management system for calculating the status of the aircraft, using the parameters representative of the aerodynamic configurations.

This step uses the equation of the dynamics of the aircraft which, in vector terms, is:

$$\sum \overrightarrow{F_{ext}} = m \frac{d\overrightarrow{V}}{dt} \qquad \text{equation 1}$$

The first determination step 301 makes it possible to model the impact of the transition on the aircraft status and to find the transition start and end points by integration of the projected differential equations coming from the above equation of the dynamics.

Projecting the vector equation on the horizontal axis, this equation then becomes:

$$m\frac{d\overrightarrow{V}}{dt} = Tx - Fx - mg\sin\gamma \qquad \text{equation 2}$$

Projecting this equation on the vertical axis, this equation then becomes:

$$Fz = mg \cos \gamma \qquad \text{equation 3}$$

In these equations:
$\overrightarrow{F_{ext}}$ represents all of the forces acting on the aircraft,
m represents the mass of the aircraft,
g is the terrestrial gravity,
γ is the descent angle of the aircraft
V is the ground speed,
Tx is the thrust of the aircraft,
Fx is the drag of the aircraft, γ is the descent angle and
Fz is the lift force.

The lift Fz can be expressed by using the following equation $$Fz = \tfrac{1}{2}\rho S V^2 Cz \qquad \text{equation 4}$$

In this equation, ρ represents the density of the air, S the aerodynamic surface, V the ground speed of the aircraft and Cz the lift coefficient of the aircraft.

The drag Fx can be expressed by using the following equation:

$$Fx = \tfrac{1}{2}\rho S V^2 Cx \qquad \text{equation 5}$$

In this expression, Cx represents the drag coefficient.

Thus, S, Cx and Cz are performance data of the aircraft necessary for the integration of the above differential equations.

Moreover, Cz and Cx are related by the equation known as the polar aerodynamic equation:

$$Cx = f(Cz) \qquad \text{equation 6}$$

The curve of the polar aerodynamic equation represents the lift curve of the wing. This curve makes it possible to carry out a bijection of Cx and Cz.

Figure 2:
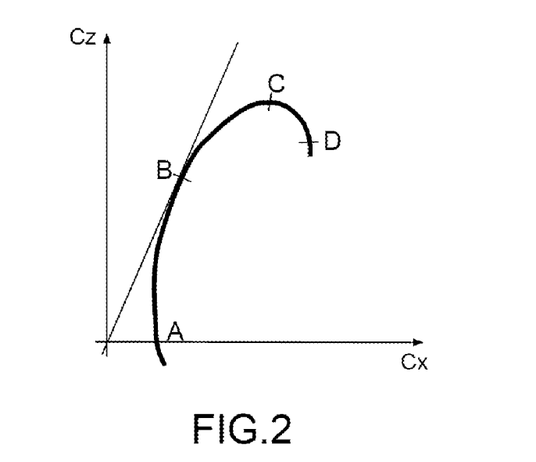
FIG. 2 shows an example of an aerodynamic polar equation.

FIG. 2 shows an example of this curve. In order to retain a bijection between Cx and Cz, the lower part of the curve (close to A) has been eliminated.

In this Figure, the point A represents a point with zero lift, the point B represents a point with a maximum lift/drag ratio, the ratio Cz/Cx is biggest at this point, the point C represents a point of maximum lift and the point D represents a stalling point. These points are specific to each aircraft.

The drag coefficient Cx is a function of the aerodynamic configuration Conf(i) of the aircraft, i being a possible configuration among Nconf configurations (i varying from 1 to Nconf).

For each aerodynamic configuration, a speed range is defined by the aircraft constructors (in a table for example, or by a function). This speed range corresponds to a range between a minimum speed permissible for the given configuration (in order to avoid stalling) and a maximum permissible speed (in order to avoid structural damage). Between these two extreme speeds, the constructor indicates a target speed for a change of configuration. This is a speed, permissible for both of the configurations (initial configuration and final configuration after the change), that is to say included between the minimum and maximum speeds for each of the two configurations.

The constructors therefore provide two modellings:

A table of target speeds for the configuration deployments Vcible_ext(i,i+1) (change from initial Conf(i) to final Conf (i+1)), and a table for the configuration retractions Vcible_ret (i+1, i) (change from initial Conf(i+1) to final Conf(i). These tables are known in the prior art. Thus, according to the prior art, the drag coefficient changes from a given value to another given value.

In one embodiment, Cx is calculated using a table, polynomial or a function contained in the database.

In general, Cx can be expressed as:

$$Cx(i)=f(Cx\_lisse, Cx\_conf(i), Cx\_m) \text{ for } i \in [1, N\text{conf}]$$

The function $f$ is for example a simple weighted sum between the different coefficients.

Cx_lisse represents the drag in smooth configuration (i.e. air brakes, slats, flaps and undercarriages retracted).
Cx_conf(i) represents the additional drag corresponding to the configuration conf(i) with deployment of the slats, flaps, undercarriages and air brakes. The database comprises a model of this additional drag corresponding to the different configurations.
Cx_m represents the drag induced by the aircraft mass.

In step 301, the determination of the transition start and end points furthermore takes into account the numerical drag variation Cx(t) which is the numerical form of dynamic drag between Cx(i) and Cx(j), i.e. the variation of the value of drag due to the change from an initial configuration Conf(i) to a final configuration Conf(j). This variation is modelled in the performance database 202.

Figure 3:
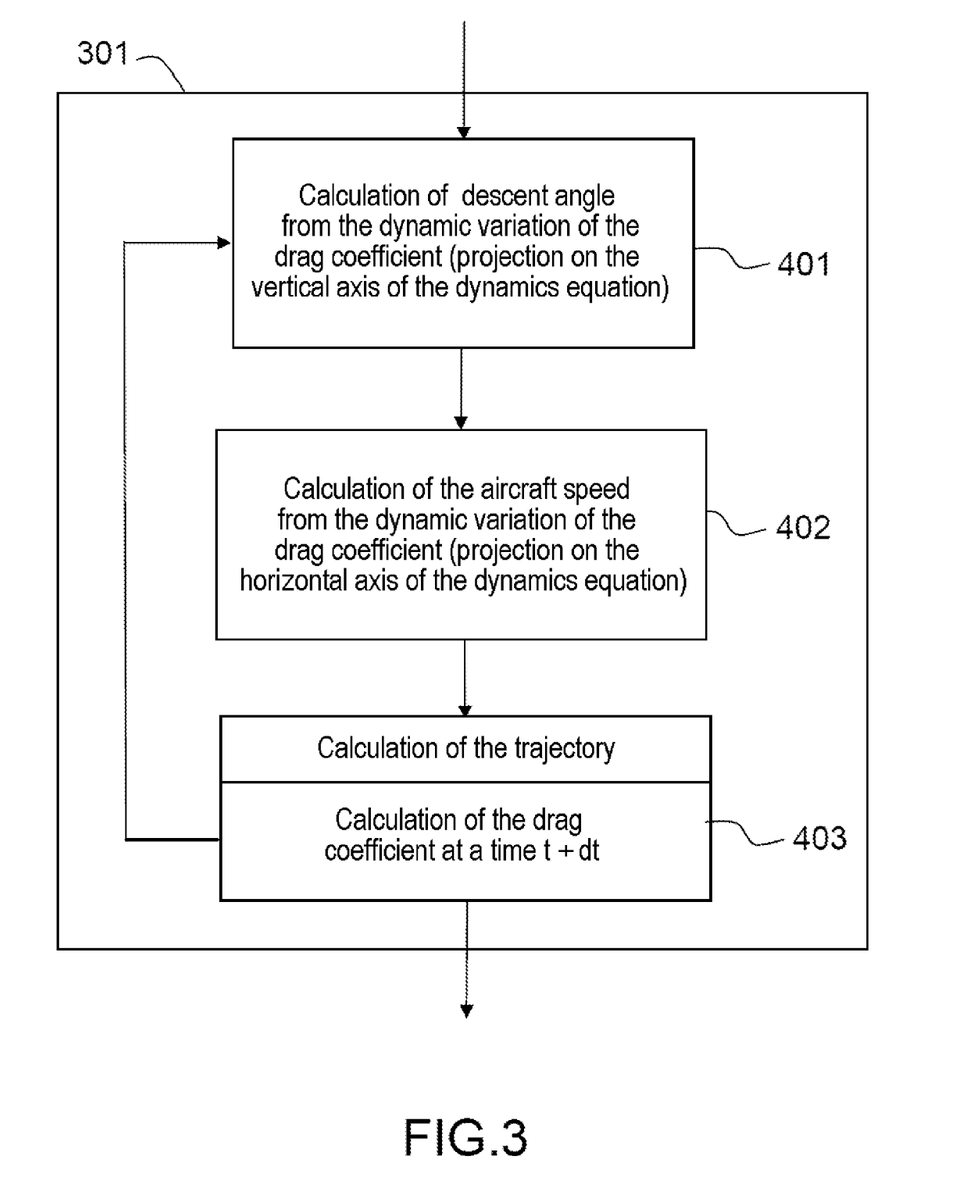
FIG. 3 shows an embodiment of the first step of determination of the transition start and end points.

FIG. 3 shows an embodiment of the first determination step 301. In this embodiment, this first step 301 comprises the following steps:

A step 401 calculates the variation of the descent angle γ:

The lift coefficient Cz is derived from the dynamic drag coefficient Cx(t) via the polar function (equation 6) and then from this is derived the lift Fz (equation 4) and finally γ is determined (equation 3, projection on the vertical axis of the vector equation 1 representative of the dynamics of the aircraft).

A step 402 calculates the variation of the speed V:

The drag Fx is derived from the dynamic drag coefficient Cx(t) (equation 5).

Then, from the knowledge of γ and Fx, the integration (by numerical integration methods of the prior art like the Runge-Kutta method) of the dynamic equation on the horizontal plane (equation 2, projection on the horizontal axis of the vector equation 1 representative of the dynamics of the aircraft) then makes it possible to calculate V.

Thus, the values of V and of γ are derived by integration of the equations of the dynamics (equation 1).

A step 403 calculates the positions of the aircraft (x and z) by integrating for a second time. This integration is carried out using the equations:

$$dx/dt = V\cos\gamma \text{ and } dz/dt = V\sin\gamma \qquad \text{equation 7}$$

In these equations x represents the longitude coordinate along the flight plan and z represents the altitude of the aircraft.

Then, step 403 calculates the drag coefficient Cx at t+dt, which is used in the next integration step: knowing the aircraft status x, z, γ, V, the method then loops back to 401.

During a phase in which a change of configuration is necessary, (for example a deceleration manoeuvre for the CDA manoeuvre), the Vcible_ext(i,i+1) table is used. When the aircraft in an initial configuration Conf(i) reaches the speed Vcible_ext(i,i+1), the integration of equation 1 is carried out considering the new aerodynamic configuration Conf(i+1).

Thus, the transition points, corresponding to the configuration change start and end positions and times along the trajectory of the aircraft, are calculated.

In this step 301, the integration of the differential equations takes into account a dynamic model of the drag coefficient Cx(t) and not constant values as in the prior art.

Figure 4:
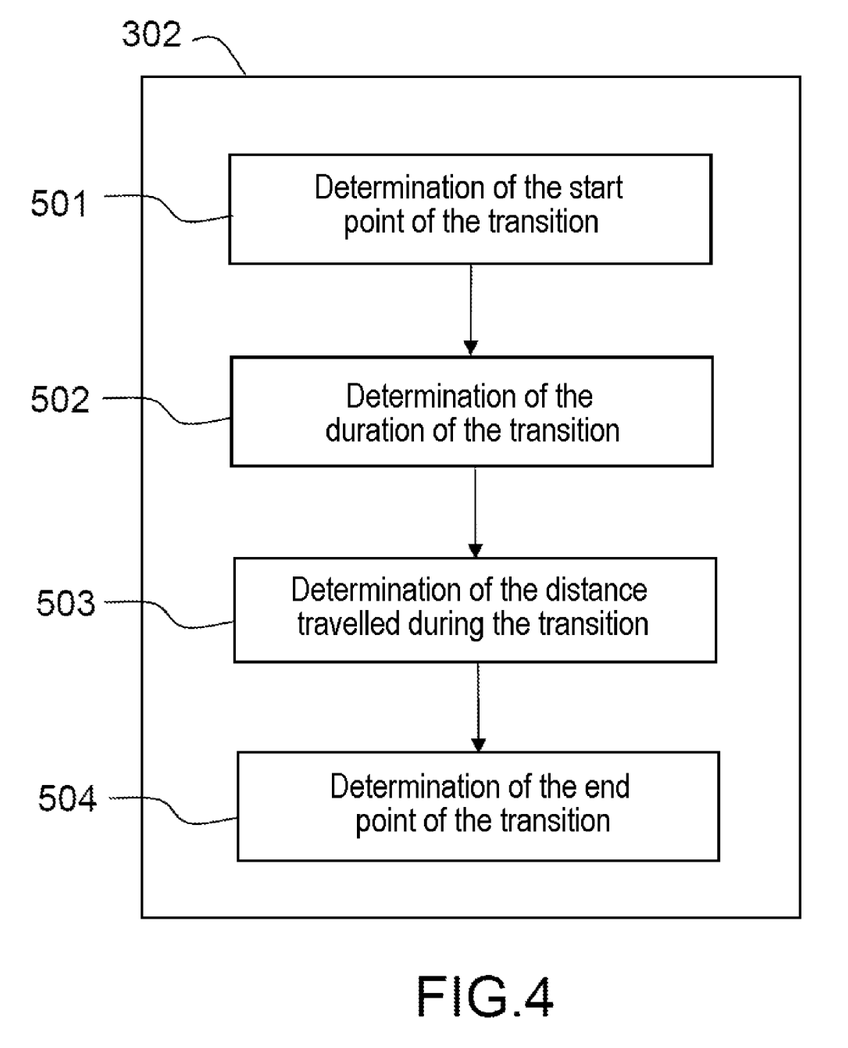
FIG. 4 shows an embodiment of the second step of determination of the transition start and end points.

FIG. 4 shows an embodiment of the second determination step 302. This step 302 takes into account constant values of the drag coefficient according to prior art, but carries out an estimation of the transition end point on the basis of a duration of the transition.

In this embodiment, this second step 302 comprises the following steps:
- a step 501 of determination of the start point associated with a transition by numerical integration of the equations representative of the dynamics of the aircraft using the said performance data and considering the transitions as immediate,
- a step 502 of determination of the duration of the transition,
- a step 503 of determination of the distance traveled during the transition from a speed of the aircraft
- and a step 504 of determination of the end point of the transition by adding the distance traveled to the start point associated with the transition.

Thus, in this embodiment, the second determination step 302 is implemented on the standard equipments of a flight management system in order to calculate the status of the aircraft and in particular the parameters representative of the aerodynamic configuration.

This step is carried out by post-processing the conventional flight path calculation in the case where the content of the database 202 does not contain modelling of the impact of the transitions on the aircraft status and therefore does not make it possible to find the transition start and end points by integration of differential equations.

This second determination step therefore assumes an instantaneous change of position of the various aerodynamic systems. For example, it is considered that the undercarriage retracts or deploys instantaneously.

However, in order to determine the start of the transition, the duration of this transition stored in the database is used. This makes it possible to determine an estimated start of the transition along the trajectory.

This step therefore makes it necessary to have performance data Cx and Cz for each configuration Conf(i) available in the database.

Thus it therefore suffices to know the duration Dt of transition between two configurations in order to position the end point of the transition at X meters from the calculated start point of the transition, also knowing the speed V at which the aircraft is flying during the transition. In order to do this the equation X=V·Dt is used.

This second determination step 302 is less precise than the first determination step 301 but requires fewer calculating resources. Moreover, this second determination step does not necessitate a phase of fine modelling of the impact of the transitions of the drag coefficient Cx.

It is also possible to take into account, in the preceding calculation, the reduction of the speed dV during the duration of the transition. The preceding formula thus becomes DX=T·dV.

Figure 5:
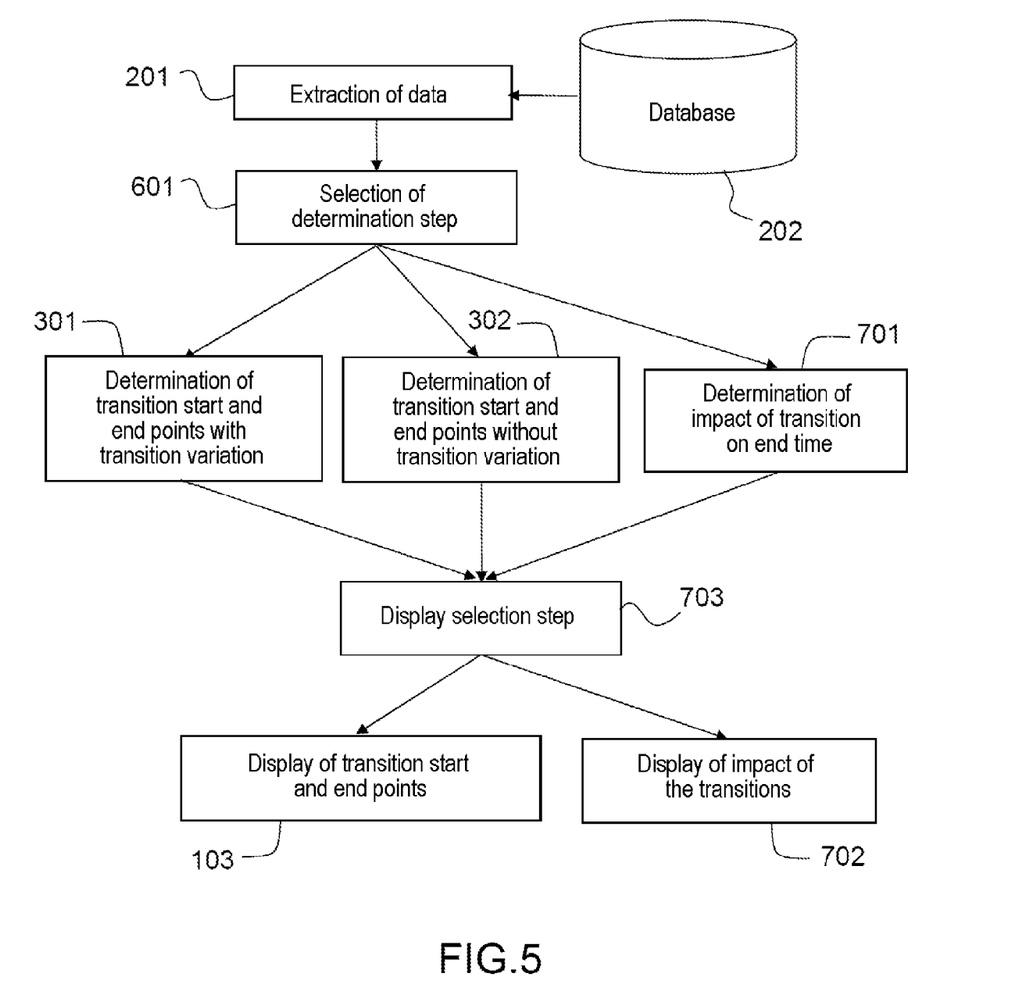
FIG. 5 shows another embodiment of the method.

FIG. 5 shows an embodiment in which the method additionally comprises a step 701 of determination of a temporal impact of the transitions on an end of flight time on the basis of the duration of each of the transitions. The method also comprises a step 702 of display of this impact.

A selection step 703 makes it possible to choose to display the pertinent results.

In one embodiment, if a determination step 301 or 302 is carried out, it is chosen, in 703, to display 103 the transition start and end points.

In another embodiment, if the determination of impact step 701 is carried out, it is chosen, in 703, to display 702 the impact of the transitions.

In another embodiment all of the calculations according to one of steps 301 or 302 and according to the determination step 701 are carried out and the step 703 of selection between the carrying out of the step 702 of display of the impact or of the step 103 of display of the transition start and end points is carried out.

The selection step 703 can be carried out automatically or manually by the user, via a man-machine interface.

In the context of a CDA procedure, the method makes it possible to improve the reliability of the time at which the aircraft will reach the end of the procedure. It also makes it possible to recalculate immediately a new time of arrival at the end of a procedure if the crew puts the aircraft into configuration at a time other than the predicted one.

Figure 6:
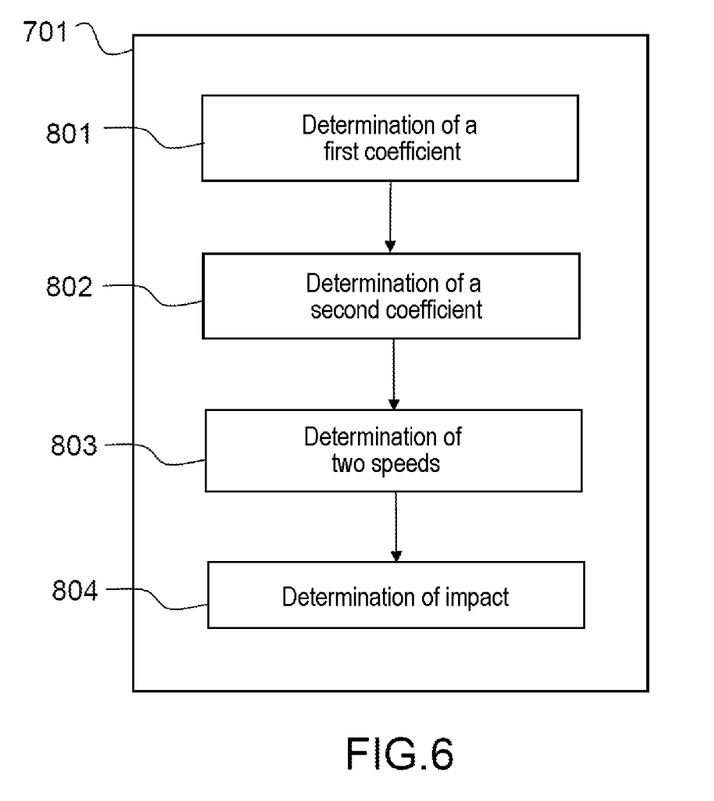
FIG. 6 shows an embodiment of the third step of determination of the impact of the transitions on the end time.

In an embodiment shown in FIG. 6, the third determination step 701 comprises:
a step 801 of determination of a first drag coefficient Cx_1 of the aircraft before a transition,
a step 802 of determination of a second drag coefficient Cx_2 of the aircraft after the transition,
a step 803 of determination of two speeds V1 and V2 of the aircraft associated with the first Cx_1 and second Cx_2 drag coefficients respectively
and a step 804 of determination of the temporal impact ΔT_induit from a difference between the two speeds.

The third determination step 701 is implemented on the standard equipments of a flight management system in order to calculate the status of the aircraft, and in particular the parameters representative of the aerodynamic configuration Cx_1 and Cx_2.

This third step 701 is carried out after processing the conventional trajectory calculation in the case where the performance data does not take account of the variation of the at least one transition between two different aerodynamic configurations. Thus, in this case, it is not possible to find the start and end points of the transition by integration of the differential equations.

Step 701 therefore assumes an instantaneous change of position of the various aerodynamic elements during a transition between a first aerodynamic configuration and a second aerodynamic configuration. For example it is considered that the undercarriage retracts or deploys instantaneously.

But in order to determine the impact on the end of procedure time, step 701 uses a modelling of the aerodynamic drag (also known by the expression Cx) induced by the change of configuration.

The following steps are used in order to carry out this modelling:
Calculation of the aircraft drag in the first aerodynamic configuration: Cx_1,
Calculation of the aircraft drag in the second aerodynamic configuration: Cx_2,
Retrieval of the duration of the transition between the two configurations Dt from the database,
Calculation of the distance traveled during the retraction/deployment/modification X=V·Dt,
Calculation of the speed $V_1$ with Cx_1 using the equation of the dynamics of the aircraft,
Calculation of the speed $V_2$ with Cx_2 using the equation of the dynamics of the aircraft,
Knowing the variation of the speed induced by the change of configuration over a distance Dx, the delta of time induced by the speed variation is derived from this using the following equation:

$$\text{Delta\_T\_induit} = \text{ABS}\left(\frac{Dx}{V_2 - V_1}\right)$$

The carrying out of this step 701 therefore necessitates having in the performance database parameters Cx_1 and Cx_2 which are respectively associated with the first and second aerodynamic configurations. These parameters are generally available from some constructors.

The method according to the invention can be restarted whenever necessary:
periodically so that the displayed information is up to date. For example, during a CDA descent, the real aircraft status at a given time can differ from the aircraft status that was predicted.
when an event occurs, when one of the input parameters of the calculation changes. In the example of the CDA procedure, if the ATC constrains the speed of the aircraft during the CDA, notably to slow it down, the method according to the invention recalculates the effect on the CDA, on the basis of this new speed, and re-determines the putting into configuration indicators (transition start and end point) by trying to find the best profile close to the CDA in order to best comply with the Estimated Time of Arrival (ETA) at the end of the CDA. In fact, the changes of aerodynamic configuration directly affect the ground speed (equation of the dynamics of the aircraft) and therefore the time of arrival ETA. Thus, by deploying (extending) aerodynamic configurations later during the descent, a higher speed is retained for a longer time and time can be saved. By deploying the aerodynamic configurations earlier, the aircraft speed will be slower earlier and it will thus be possible to delay the time of arrival ETA.

Figure 7:
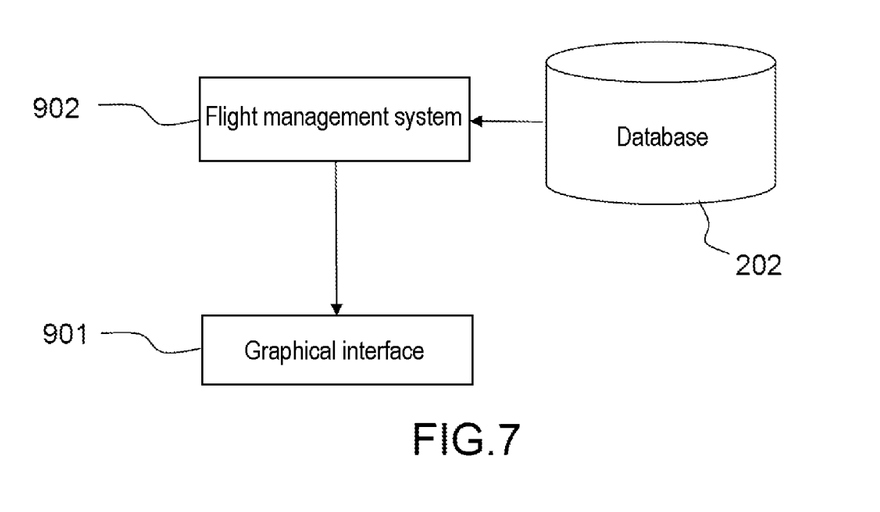
FIG. 7 shows an embodiment of the flight management system according to the invention.

FIG. 7 shows an embodiment of a flight management system using the method that is the subject of this invention.

The system comprises a graphical interface 901 configured for the display of the transition start and end points and/or for the display of the impact of the transitions on an end time of the flight. The system also comprises a processor 902 configured to implement the method of the invention and a database 202.

Figure 8A:
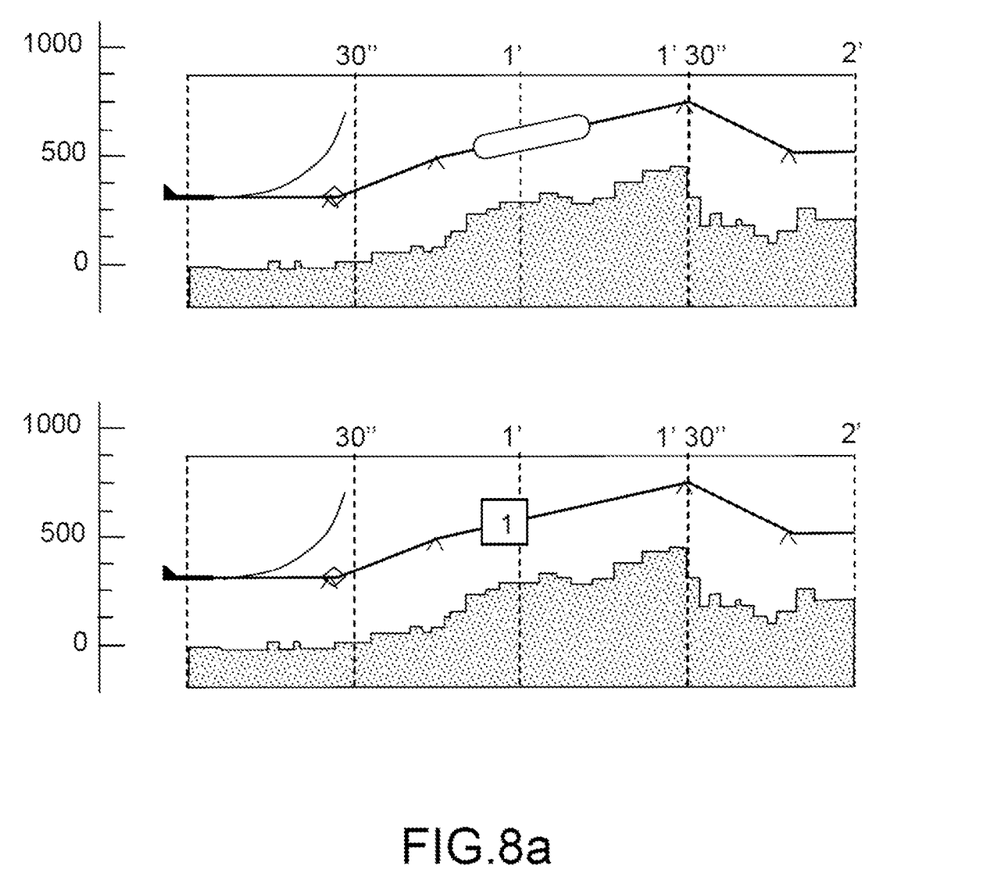
Figure 8B:
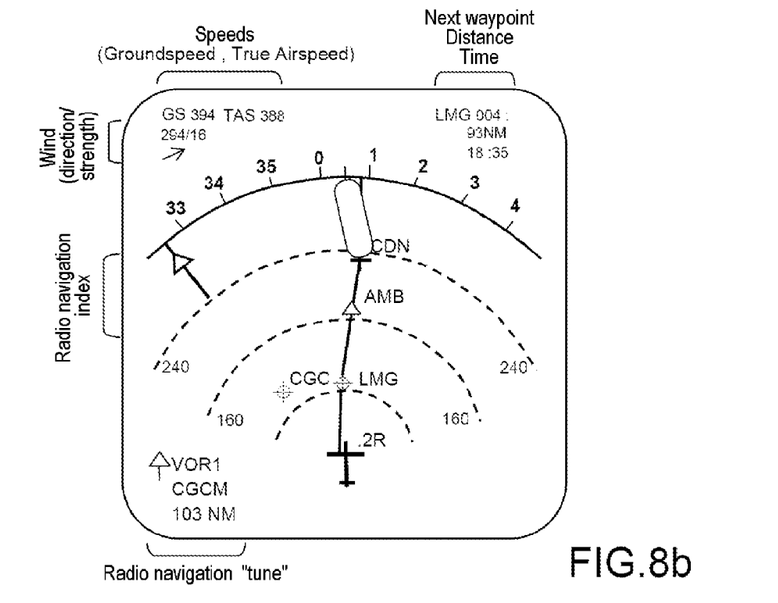

The display of the start and end points of the transitions can be carried out in one embodiment by presenting the transition zone. This can be done, as shown at the top of FIG. 8.*a* or of FIG. 8.*b* in the form of an oval.

It is also possible to represent the start and end points of the transition i by the indications "di" for the start and "fi" for the end as shown in FIG. 8.*c* on the left.

It is also possible to show only the recalculated point i as in FIG. 8.*c* on the right or in FIG. 8.*a* at the bottom.

Figure 8C:
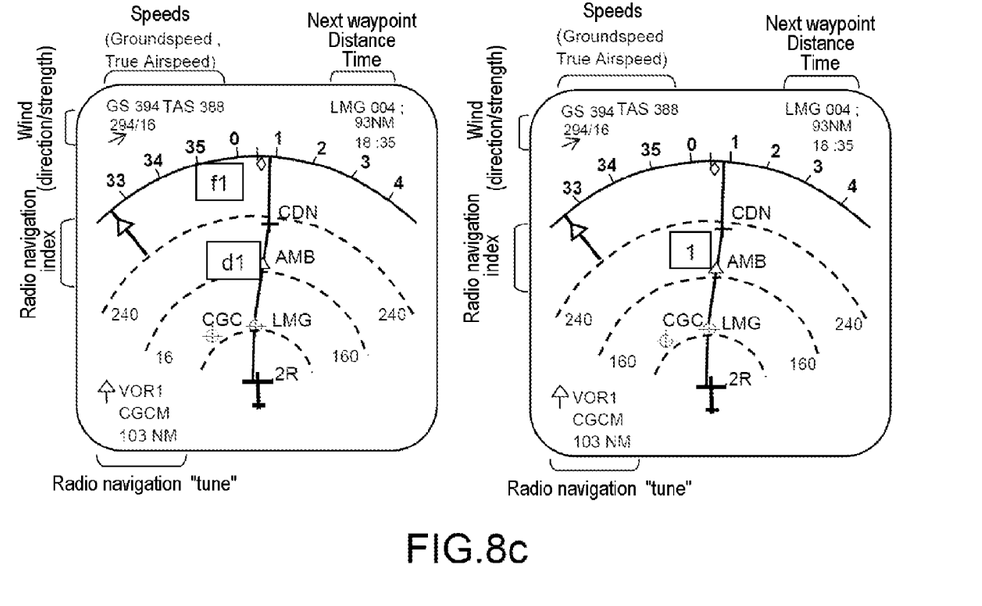
Figure 8D:
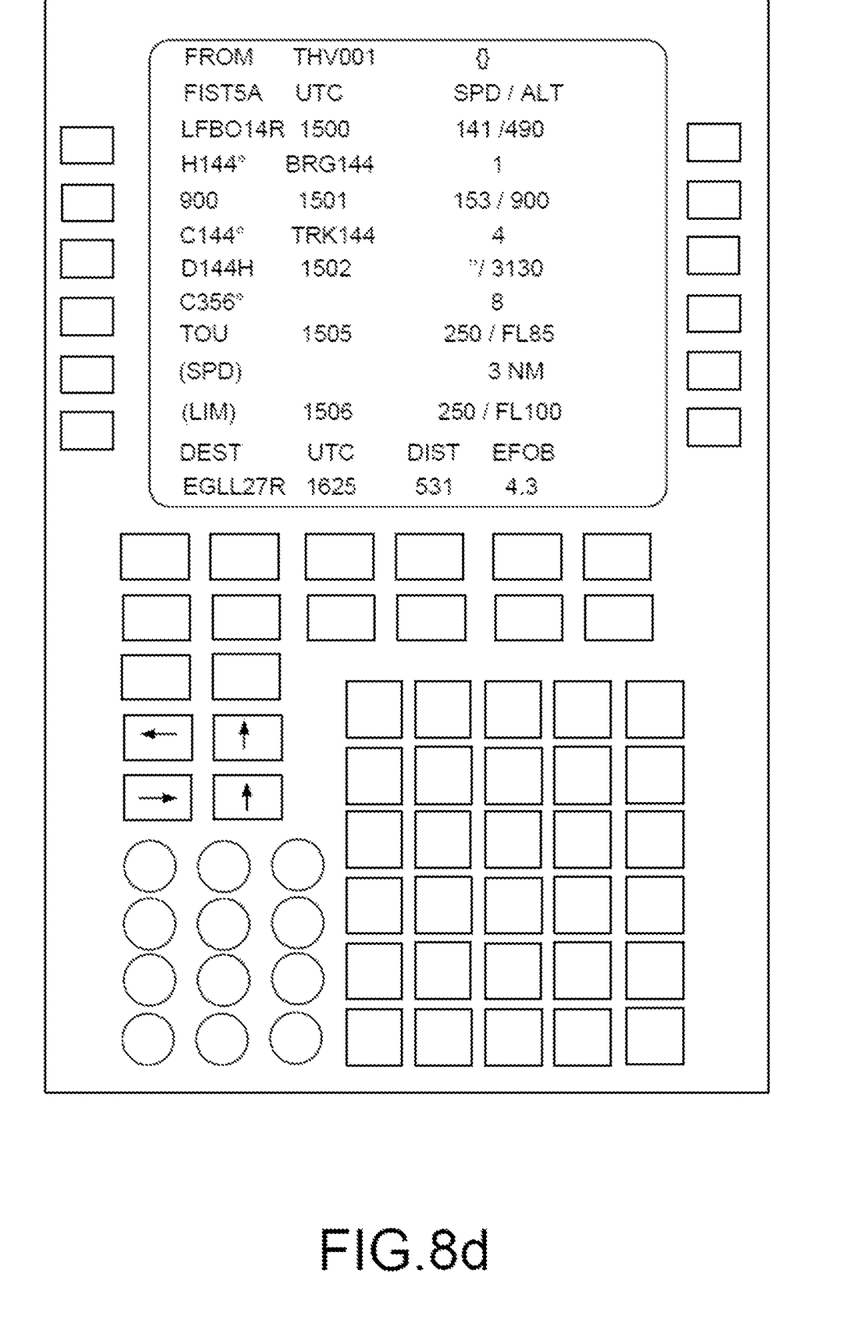

This display therefore shows, according to the calculated predictions, the place at which the putting of the corresponding configuration into position must be started and at which place it is actually positioned.

It is also possible to enlarge the transition zone, which amounts to showing a range of possible location for the start of a transition to the new configuration. In this case, the information makes it possible to carry out the start of the transition in a wider area and not solely at the start of the displayed zone. In particular, this makes it possible to allow a little more flexibility to the crew for carrying out this manoeuvre. The displayed end zone of the transition can be enlarged by a value that makes it possible to continue to comply with the end time of the continuous descent approach to within a margin of tolerance.

For example, if the end time of the continuous descent approach must be kept to within a tolerance of T sec, and the type of aircraft modelled comprises three different configuration deployments, it is possible to enlarge each range i by $T1_i$ seconds before the calculation coming from one of the determination steps, and by $T2_i$ seconds after the calculation of one of the determination steps. Thus the sum of the $T1_i$ values (i=1 . . . 3) does not cause an arrival more than T seconds after the predicted arrival, and the sum of the $T2_i$ values (i=1 . . . 3) does not cause an arrival more than T seconds before the predicted time of arrival. In fact, if the different aerodynamic configurations are systematically put into position earlier (the $T1_i$ case), the aircraft is slowed down more than predicted and the aircraft therefore arrives a little later (and vice versa for the $T2_i$ case).

Thus, knowing for a given configuration i, the speed $V1_i$ before and $V2_i$ after the putting into configuration, the temporal impact of a change from the speed $V1_i$ to the speed $V2_i$, is known $T1_i$ seconds earlier. In fact, the aircraft will have $T1_i$ seconds earlier than predicted at the speed $V2_i$. Knowing that the initially calculated length of the distance traveled at the speed $V1_i$ over a duration of $T1_i$ seconds is equal to $D_i = V1_i \cdot T1_i$, and that this length will be traveled at $V2_i$ if the aerodynamic configurations are put into position earlier, the resulting additional time will be equal to $T3_i = T2_i - T1_i$ according to the following formula:

$$T3_i = T2_i - T1_i$$

$$= \frac{(V1_i * T1_i)}{V2_i} - T1_i$$

$$= \frac{[(V1_i * T1_i) - (V2_i * T1_i)]}{V2_i}$$

$$= \frac{(V1_i - V2_i)T1_i}{V2_i}$$

In fact the temporal error of a change from the speed $V1_i$ to the speed $V2_i$, that is to say the time delta $T3_i$ over a constant distance traveled $D_i$, is given by the formula $T3_i = T2_i - T1_i$ with an initially predicted distance traveled $D_i = V1_i * T1_i$ but traveled at $V2_i$ and therefore $D_i = V2_i * T2_i$.

Thus the sum of the $T3_i$ values obtained using the preceding formula must not therefore exceed T. (Vice versa for the calculations with $T2_i$).

In another embodiment, the display is as shown in FIG. 8.*d*. In this figure a display page of the flight plan is shown on a graphical interface. This graphical interface is known by its English acronym MCDU standing for "Multifunction Control Display Unit". It is also possible to use an FMD (FMS Display) of a flight management system. The FMD corresponds to the display area of the FMS pages and associated parameters. In both of these cases, it is possible to display the start and end times associated with the different transitions and possibly the impact of these different transitions. These displays are for example possible in the Time field.

Figure 9:
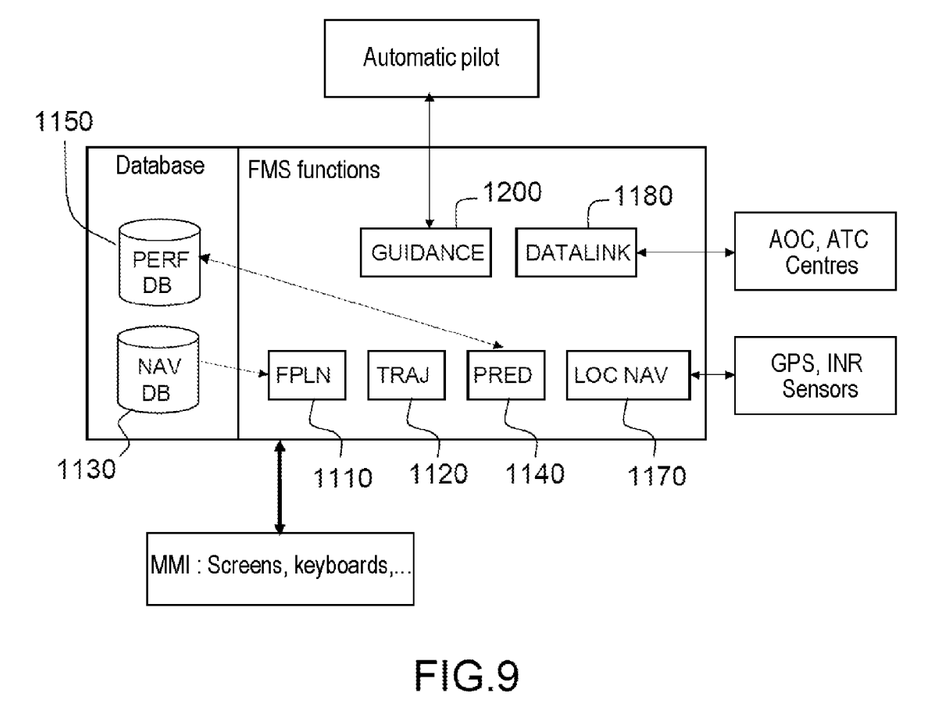
FIG. 9 shows an embodiment of the flight management system capable of using the method of the invention.

FIG. 9 shows another embodiment of a flight management system 902 adapted for the use of the method of the invention. In this embodiment the system offers the functions provided in the ARINC 702 standard. These functions are the following in particular:

Navigation, LOCNAV 1170: for carrying out the optimum location of the aircraft as a function of the geolocation means (GPS, GALILEO, VHF radio beacons, inertial navigation systems);

Flight plan, FPLN 1110: for entering the geographic elements constituting the skeleton of the route to be followed (departure and arrival procedures, waypoints, airways);

Navigation database, NAVDB 1130: for constructing geographic routes and procedures on the basis of data included in the databases (points, beacons, intercept or altitude legs . . . );

Performance Database, PRF DB 1150: containing the aerodynamic and engine parameters of the aircraft with, in particular, elements making it possible to integrate the aircraft trajectory taking account of the effect of the transitions, and/or of the elements allowing an estimation of the durations of the transitions;

Lateral trajectory, TRAJ 1120: for constructing a continuous trajectory from the points of the flight plan, complying with the aircraft performance and the confinement constraints (RNP), this element in particular makes it possible to implement the method described in this invention;

Predictions, PRED 1140: for constructing an optimized vertical profile on the lateral trajectory;

Guidance, GUID 1200: for guiding the aircraft in the lateral and vertical planes on its 3D trajectory, whilst optimizing its speed;

Digital data link, DATALINK 1180: for communication with control centres and with other aircraft.

The lateral trajectory is calculated from the flight plan defined by the pilot (list of waypoints): the lateral trajectory is calculated as a function of the geometry between the waypoints (commonly called LEG) and/or the altitude and speed conditions (which are used for calculating the turn radius). Upon this lateral trajectory, the FMS optimizes a vertical trajectory (in altitude and speed) taking account of possible constraints in altitude, speed and time.

It is this vertical trajectory that makes it possible to determine the position of the start and end points of each transition as well as the impact of these transitions on the end of procedure or end of flight phase time.

All of the information entered or calculated by the FMS is grouped on display screens as described above (MFD pages, NTD and PFD display, HUD etc. . . . ). According to a preferred embodiment, some of these screens display the transition start and end points calculated by the method according to the invention.

The invention claimed is:

1. A method for managing a flight of an aircraft flying a trajectory determined from a flight plan and calculated by a flight management system, the trajectory necessitating at least one transition between two different aerodynamic configurations of the aircraft, the method comprising:
 a step of extraction of performance data of the aircraft from a database, at least one item of performance data being a function of an aerodynamic configuration,
 a step of selection between a first determination step and a second determination step,
 a step of determination of a start point and of an end point of the transition between two aerodynamic configurations and engine speeds of an aircraft during a flight, the determination step being implemented by the flight management system and chosen from among the first and second determination steps,
 the determination step calculating the trajectory by numerical integration of the equations representative of the dynamics of the aircraft making use of the performance data of the aircraft,
 the first determination step implemented by the flight management system taking account of a variation of the performance data during the transition, and being selected when the performance data make it possible to calculate the variation,
 the second determination step implemented by the flight management system considering the transition as immediate and being selected when the performance data do not make it possible to calculate the variation, and
 a step of displaying at least a portion of the trajectory and of displaying the transition on a graphical user interface.

2. The flight management method according to claim 1, wherein the method is used during a continuous descent procedure.

3. The flight management method according to claim 1, wherein the first determination step comprises:
 a step of calculating a variation of descent angle from a dynamic drag coefficient,
 a step of calculating a speed variation of the aircraft from the dynamic drag coefficient,
 a step of calculating a variation of the trajectory of the aircraft followed by a calculation of the value of the drag coefficient at a time t+dt, as an input value in the step of determining the variation of the descent angle of the aircraft.

4. The flight management method according to claim 1, wherein the second determination step comprises:
 a step of determining the transition start point by numerical integration of the equations representative of the dynamics of the aircraft using the performance data, considering the transition as immediate,
 a step of determination of the duration of the transition,
 a step of determination of the distance traveled during the transition from a speed of the aircraft and
 a step of determination of the end point of the transition by adding the distance traveled to the start point associated with the transition.

5. The flight management method according to claim 1, further comprising a step of determination of a temporal impact of the transition on an end time of the flight from the duration of the transition.

6. The flight management method according claim 5, wherein the third determination step comprises:
 a step of determination of a first drag coefficient of the aircraft before the transition,
 a step of determination of a second drag coefficient of the aircraft after the transition,
 a step of determination of two speeds of the aircraft associated with the first and second drag coefficients respectively and
 a step of determination of the temporal impact from a difference between the two speeds.

7. The flight management method according to claim 5, further comprising a step of displaying the impact.

8. The flight management method according to claim 1, further comprising a step of displaying the transition start point and/or the transition end point for each transition.

9. The flight management method according to claim 7, further comprising a step of selection between the carrying out of a step of display of the impact or a step of display of the transition start and end points.

10. The flight management system of an aircraft flying a trajectory determined from a flight plan, the trajectory necessitating at least one transition between two different aerodynamic configurations of the aircraft, for the use of the method according to claim 1, comprising:
 a database comprising:
 elements making it possible to calculate the trajectory of the aircraft taking into account of a variation of the performance data during the transition, and/or elements allowing an estimation of the duration of the transition;
 a processor configured or programmed to determine a start point and an end point of a transition between two aerodynamic configurations and engine speeds of an aircraft during a flight by calculation of the trajectory by numerical integration of the equations representative of the dynamics of the aircraft using the performance data of the aircraft; and
 a graphical interface configured to display the start points and end points of transitions.

11. The flight management system of an aircraft flying a trajectory determined from a flight plan, the trajectory necessitating at least one transition between two different aerodynamic configurations of the aircraft, for the use of the method according to claim 1, comprising:
 a database comprising:
 elements making it possible to calculate the trajectory of the aircraft taking into account of a variation of the performance data during the transition, and/or
 elements allowing an estimation of the duration of the transition;
 a processor configured or programmed to determine a start point and an end point of a transition between two aerodynamic configurations and engine speeds of an aircraft during a flight by calculation of the trajectory by numerical integration of the equations representative of the dynamics of the aircraft using the performance data of the aircraft; and
 a graphical interface configured to display the start points and end points of transitions;

wherein the method further comprises a step of determination of a temporal impact of the transition on an end time of the flight from the duration of the transition; and wherein the processor is configured or programmed to determine an impact of the transition on an end time of the flight from a duration of the transition and wherein the graphical interface is configured to display the impact.

* * * * *